United States Patent
Gabriel et al.

(10) Patent No.: US 10,033,615 B2
(45) Date of Patent: *Jul. 24, 2018

(54) SCALABLE OFF-LOAD OF APPLICATIONS FROM SWITCH TO SERVER

(71) Applicant: International Business Machines Corporation, Armonk, NY (US)

(72) Inventors: Cynthia Ann Gabriel, Gilroy, CA (US); Bill Shao, Pleasanton, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,357

(22) Filed: Nov. 7, 2013

(65) Prior Publication Data

US 2014/0068070 A1    Mar. 6, 2014

Related U.S. Application Data

(63) Continuation of application No. 13/536,635, filed on Jun. 28, 2012, now Pat. No. 9,692,676.

(51) Int. Cl.
*G06F 15/173* (2006.01)
*H04L 12/26* (2006.01)
*H04L 12/24* (2006.01)

(52) U.S. Cl.
CPC ............ *H04L 43/10* (2013.01); *H04L 41/028* (2013.01); *H04L 43/0817* (2013.01)

(58) Field of Classification Search
CPC ............... H04L 29/08837; H04L 29/14; H04L 67/2861; H04L 67/1034; H04L 67/1048; H04L 5/0064
See application file for complete search history.

(56) References Cited

U.S. PATENT DOCUMENTS

| | | | | |
|---|---|---|---|---|
| 6,295,558 | B1 * | 9/2001 | Davis | H04L 41/0663 709/224 |
| 6,578,066 | B1 * | 6/2003 | Logan et al. | 718/105 |
| 7,155,722 | B1 * | 12/2006 | Hilla | G06F 9/505 718/105 |
| 7,551,627 | B2 * | 6/2009 | Scholl | 370/400 |

(Continued)

FOREIGN PATENT DOCUMENTS

JP     2009016987    1/2009

OTHER PUBLICATIONS

Non-Final Office Action in related U.S. Appl. No. 13/536,635, dated Jul. 7, 2014; 25 pages.

(Continued)

*Primary Examiner* — Mohamed A Wasel
*Assistant Examiner* — Tsung Y Wu
(74) *Attorney, Agent, or Firm* — Schmeiser, Olsen & Watts LLP

(57) ABSTRACT

Systems include a network element with a plurality of server blades, including a control server and one or more application servers. The control server communicates with each application server to acquire state information about each application server. A switch is in communication with each server blade. The switch is configured to communicate with the control server in order to obtain therefrom the state information acquired by the control server about each application server.

7 Claims, 6 Drawing Sheets

(56) References Cited

U.S. PATENT DOCUMENTS

| | | | |
|---|---|---|---|
| 7,797,565 B1* | 9/2010 | Tran et al. | 714/4.1 |
| 2002/0178178 A1 | 11/2002 | Peng | |
| 2002/0188718 A1* | 12/2002 | McGraw et al. | 709/224 |
| 2004/0054780 A1* | 3/2004 | Romero | 709/226 |
| 2005/0090249 A1* | 4/2005 | Straulino | 455/432.3 |
| 2007/0078999 A1* | 4/2007 | Corson | H04W 8/12 709/230 |
| 2008/0080495 A1* | 4/2008 | Barrett et al. | 370/389 |
| 2008/0095339 A1 | 4/2008 | Elliott et al. | |
| 2008/0134211 A1* | 6/2008 | Cui | 719/318 |
| 2008/0162691 A1* | 7/2008 | Zhang | H04L 41/00 709/224 |
| 2008/0181106 A1 | 7/2008 | Bertagnole et al. | |
| 2010/0077312 A1* | 3/2010 | Morss | H04L 12/2818 715/740 |
| 2010/0131638 A1* | 5/2010 | Kondamuru | 709/224 |
| 2010/0158004 A1 | 6/2010 | Tarkoma | |
| 2010/0325485 A1* | 12/2010 | Kamath et al. | 714/15 |
| 2011/0173441 A1 | 7/2011 | Bagepalli et al. | |
| 2012/0016932 A1 | 1/2012 | de Castro et al. | |
| 2013/0336104 A1* | 12/2013 | Talla et al. | 370/216 |

OTHER PUBLICATIONS

Final Office Action in related U.S. Appl. No. 13/536,635, dated Mar. 5, 2015; 17 pages.
Non-Final Office Action in related U.S. Appl. No. 13/536,635, dated Jan. 29, 2016I 20 pages.
Final Office Action in related U.S. Appl. No. 13/536,635, dated Aug. 30, 2016; 18 pages.

\* cited by examiner

SCALABLE OFF-LOAD OF APPLICATIONS FROM SWITCH TO SERVER

RELATED APPLICATION

This application is a continuation application of U.S. patent application Ser. No. 13/536,635, filed on Jun. 28, 2012, titled "Scalable Off-Load of Applications from Switch to Server", the contents of which are incorporated by reference herein in their entirety.

FIELD OF THE INVENTION

The invention relates generally to data centers and data processing in data centers comprised of switches and servers. More particularly, the invention relates to off-loading computing processes from switches to servers.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. Within the data center, switches often monitor the status of other components, such as the servers, in order to make packet forwarding decisions. Limitations on the computing power of a switch, however, can constrain the number of servers that the switch is able to monitor. Not only do the limitations of the switch pose a performance bottleneck, but they can also limit the scalability of the data center.

SUMMARY

In one aspect, the invention features a network element comprising a plurality of server blades including a control server and one or more application servers. The control server communicates with each application server to acquire state information about each application server. The network element further comprises a switch in communication with each server blade. The switch is configured to communicate with the control server in order to obtain therefrom the state information acquired by the control server about each of the application servers.

In another aspect, the invention features a data center comprising a plurality of interconnected network elements. Each network element comprises a switch and a plurality of server blades including one or more application servers. The server blades of a given one of the network elements further include a control server. The control server communicates with each application server of each network element to acquire state information about that application server. The switch of the given network element is in communication with each server of the plurality of server blades of the given network element. The switch of the given network element is configured to communicate with the control server in order to obtain therefrom the state information acquired by the control server about each of the application servers of each network element.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Described herein are systems and methods for offloading computing processes, for example, server health checking, from a switch, which generally has limited CPU and memory capacity, to one or more server blades. The offloading reduces the computing load on the CPU of the switch by enabling a control server to monitor the application servers on behalf of the switch and to provide asynchronous status updates directly to the switch. Accordingly, the switch does not perform any health checks of the application servers because the control server performs this role. The role of the switch is to report its currently held view of the state information of the application servers to the control server on a periodic basis. If the current views of the control server and the switch are out-of-sync, the control server sends operational requests to the switch to update the switch with the latest state information about the application servers.

The offloading thus achieves a division of labor, as the CPU-intensive work of the health check operation is offloaded from the switch to the control server, leaving the switch to apply its CPU capacity to other operations, for example, traffic shaping. As a result, the offloading removes a performance bottleneck at the switch and achieves a scalability that enables more server blades/application servers and server appliances to be added to the data center than could otherwise be handled by the switch alone.

Figure 1:
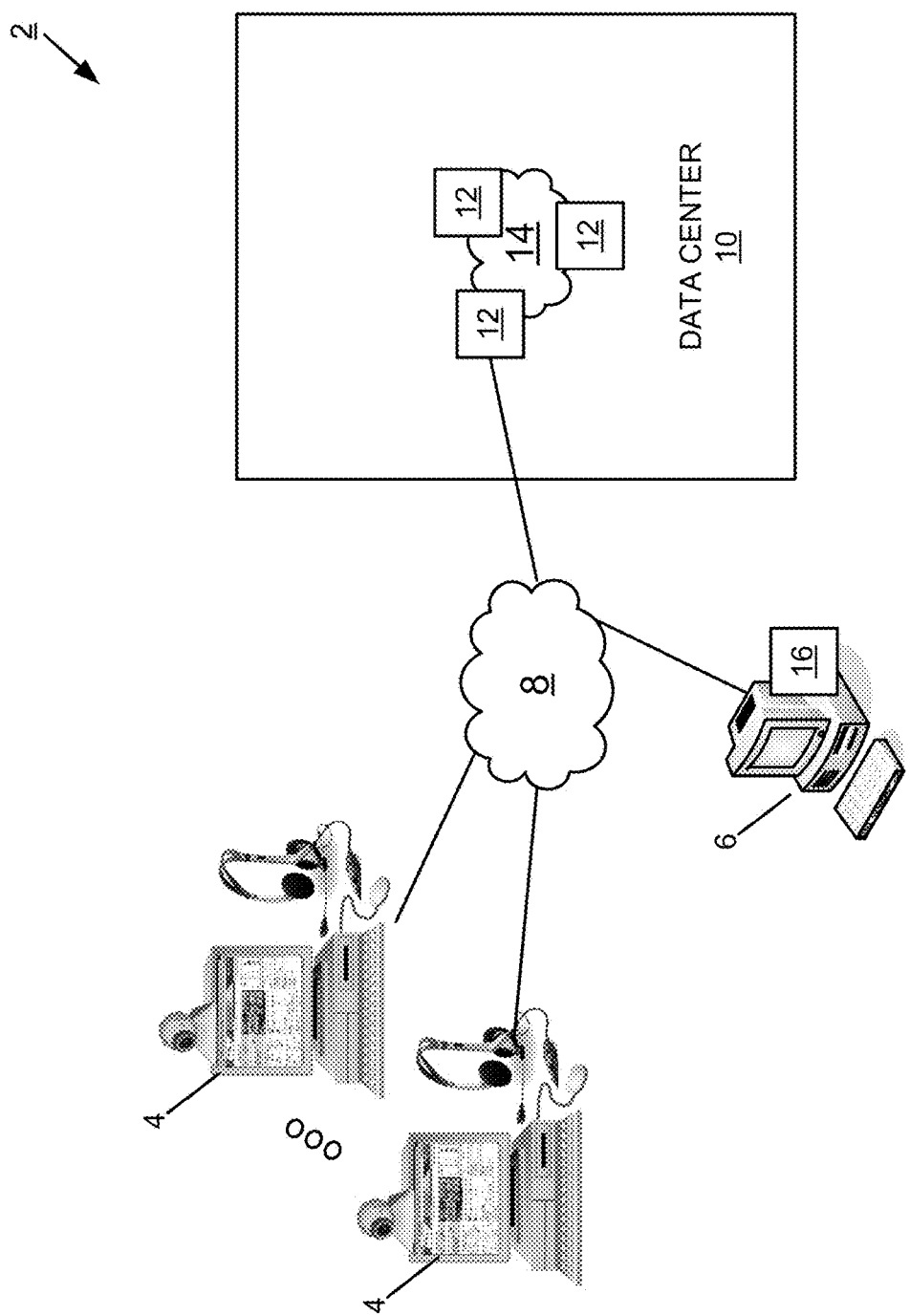
FIG. 1 is an embodiment of a networking environment including a data center, client systems, and a management station.

FIG. 1 shows an embodiment of a networking environment 2 including a data center 10 in communication with a plurality of client systems 4 and a management station 6 over a network 8. In general, the client systems 4 are computer systems running applications that require the services of the data center 10. The management station 6 provides a centralized point of administration for managing the data center 10. The client systems 4 and a management station 6 communicate with data center 10 over the network 8, embodiments of which include, but are not limited to, local-area networks (LAN), metro-area networks (MAN), and wide-area networks (WAN), such as the Internet or World Wide Web. Although shown external to the data center 10, in one embodiment, the management station 6 may be part of the data center 10.

The data center 10 is generally a facility that houses various computers, routers, switches, and other associated equipment in support of applications and data that are integral to the operation of a business, organization, or other entities. The data center 10 includes a plurality of network elements 12 interconnected into a network 14. Each of the network elements 12 are independent (standalone) electronic enclosures or chassis. The data center 10 can have fewer or more than the three network elements 12 shown. In addition, embodiments of the data center 10 may be at a single site or distributed among multiple sites.

In brief overview, the network elements 12 of the data center 10 provide switching and server services for packet-traffic from the client systems 4. Through an external management agent 16 running on the management station 6, an administrator of the data center 10 can communicate with one or more of the network elements 12 in order to statically configure the network elements 12 to offload certain computing processes conventionally performed by a switch to certain servers, as described in more detail below. The configuration can also operate to adjust the server capacity dynamically for supporting services.

The management station 6 can connect directly (point-to-point) or indirectly to a given network element 12 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet or SNMP (Simple Network Management Protocol), the management station 6 can access a command-line interface (CLI) of the given network element 12.

Figure 2:
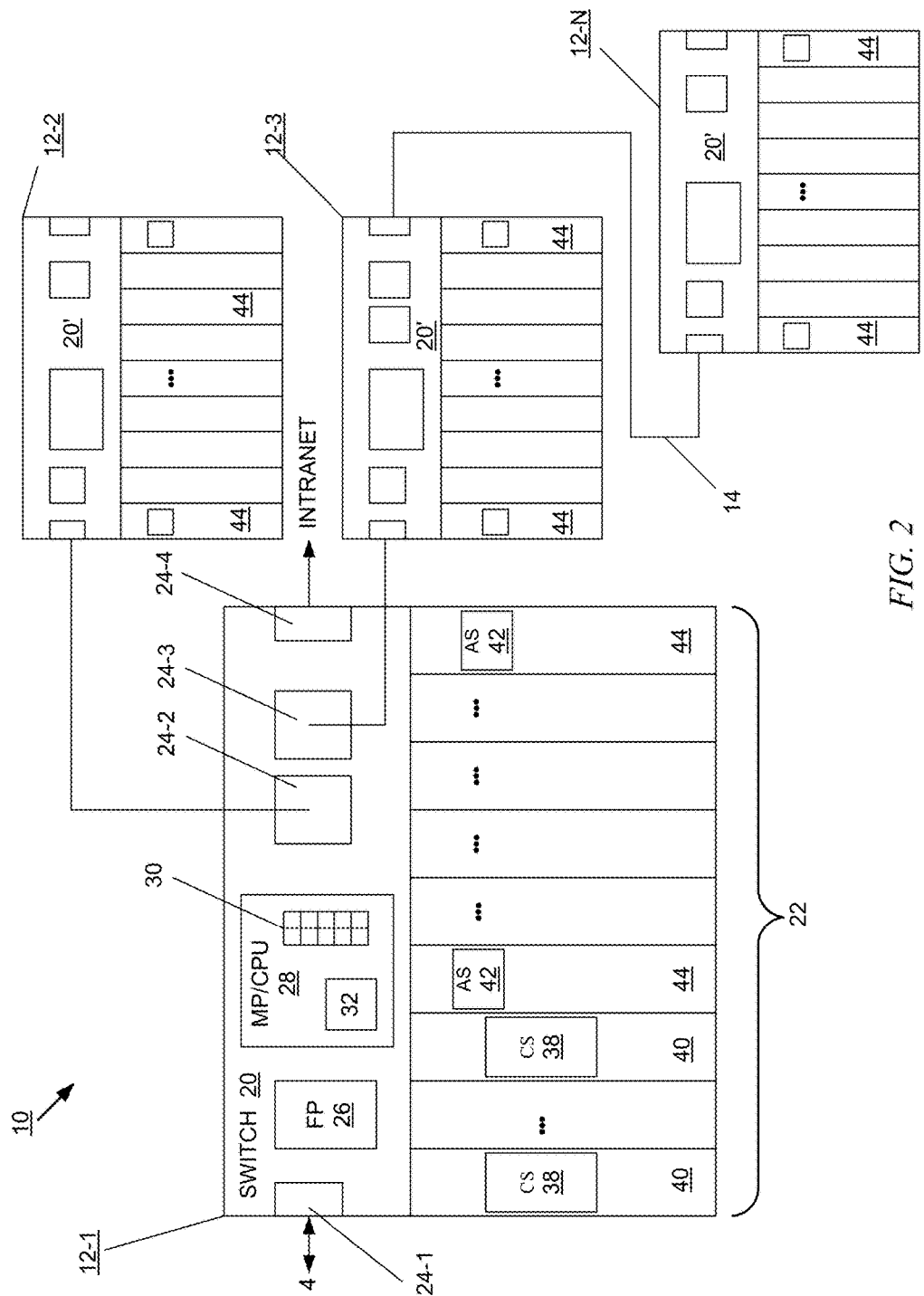
FIG. 2 is a diagram of an embodiment of the data center including a plurality of interconnected network elements.

FIG. 2 shows an embodiment of the data center 10 including a network element 12-1 comprised of a switch 20 and server blades (or simply servers) 22 in communication with the switch 20. In general, each server blade 22 is a computer that provides one or more services to the data center 10, examples of which include, but are not limited to, email servers, proxy servers, DNS (Domain Name System) servers, HTTP (HyperText Transport Protocol) servers, firewall servers, video compression servers, deduplication servers.

The switch 20 includes ports 24-1, 24-2, 24-3, 24-4 (generally, 24) in communication with external systems (i.e., client systems, other network elements, networking equipment), and server-facing ports (not shown) in communication with the servers 22. In the example data center 10, the port 24-1 is in communication with client systems 4 over the network 8 (FIG. 1), the port 24-2 is in communication with a port of a second network element 12-2, and the port 24-3 is in communication with the port of a third network element 12-3, which is daisy-chained to another network element 12-N, and the port 24-4 couples the network element 12-1 to a local network (e.g., an Intranet). The switch 20 can have fewer or more than the number of ports 24 shown. In one embodiment, the switch 20 is an Ethernet switch and the ports 24 of the switch 20 can support 10 GB line rates. In addition, the data center 10 generally has more network elements 12 than those shown, although the network element 12-1 alone is sufficient to illustrate the principles of the invention.

In addition, the switch 20 includes a frame processor (FP) 26, a management processor (MP) or CPU 28, and a server state table 30. Implementation of the switch 20 can be with ASIC (Application Specific Integrated Circuit) technology on one or more semiconductor chips. In general, the frame processor 26 includes logic for forwarding packets bidirectionally between ports (e.g., port 24-1 and server-facing ports), using a packet-forwarding table (not shown) to determine the packet-forwarding behavior of the switch 20. The frame processor 26 may be implemented as hardware, software, or a combination of hardware and software. Examples of the packet-forwarding table include, but are not limited to, an L2 forwarding table, an L3 routing table, a link aggregation (i.e. static or LACP trunk) table, an Equal Cost Multi Path (ECMP) table, and a frame/field processor (i.e. access control list) table.

The management processor 28 dynamically adds, removes, or modifies entries in the packet-forwarding table used by the frame processor 26. In addition, the management processor 28 constantly monitors the health of the server blades 22 by offloading the responsibility for performing the health checks to designated server blades 22, as described further below. Examples of such health-check mechanisms include, but are not limited to, a link-state health check, a PING health check, an ARP (Address Resolution Protocol) health check, a UDP/TCP (User Datagram protocol/Transmission Control Protocol) health check, a service-based health check (i.e. HTTP, SMTP, SSL, SIP, etc.), and a user scriptable health check.

The management processor 28 maintains a server state table 30, which holds state information about each server blade 22 as presently viewed by the switch 20. The state information for each server blade 22 includes a MAC address, an IP address, an operational state (enabled or disabled), and an alive state (enabled or failed). The alive state pertains to servers that are operationally enabled. The "operational" state and "alive" state information are managed independently. The state information ultimately affects the packet-forwarding behavior of the switch 20, because the switch 20 can forward packets to only those servers that are operationally enabled and alive. The management processor 28 may be implemented as hardware, software, or a combination of hardware and software.

The switch 20 also includes an application program interface (API) 32 through which the offloading behavior of the switch 20 can be configured. Here, for example, the management processor 28 has the API 32. The API 32 enables external agents to communicate with the switch 20 to command the switch 20 to perform certain functions. For example, the external management agent 16 (FIG. 1) or any of the server blades 22 can use the API 32 to cause the switch 20 to update the state information kept in the server state table 30.

The API 32 provides operational commands that allow an external agent to perform certain functions directly on the switch 20 (e.g., using SNMP). One command causes the switch 20 to set the health check alive state (ena/dis) for a specified server 22. A second command directs the switch 20 to issue an ARP request to the IP address of a specified server 22 to update the ARP entry (MAC and port) on the switch 20. All servers 22 have a defined RIP (Real IP address) in the switch configuration and an L3 network interface with which to connect. Other commands cause the switch 20 to enable or disable a specified server 22. In addition, the API 32 has a health check option to allow the switch 20 to prepare a packet containing the switch's current view of the state of all servers 22 and to send the packet to a designated server 22 at a configurable interval, as described in more detail below.

Each of the server blades 22 includes a software module that determines the role of the server blade 22 in the health check process. One or more of the servers 22 runs control-service (CS) software 38; hereafter, such server blades are referred to as control servers 40. The other servers 22 run application-service (AS) software 42; hereafter, such servers 22 are referred to as application servers 44. Through execution of the CS software 38, the control server 40 performs its role of actively monitoring and directly setting the states of the application servers 44 and reporting updates of these states to the switch 20. Through execution of the AS software 42, an application server 44 performs multiple functions such as responding to health check requests to communicate its current application state in addition to its role of providing one or more services to the data center 10, examples of which include, but are not limited to, email servers, proxy servers, DNS (Domain Name System) servers, HTTP (HyperText Transport Protocol) servers, firewall servers, video compression servers, deduplication servers, etc.

The other network elements 12-2, 12-3, 12-N include other application servers 44 with which a control server 40 of network element 12-1 communicates in order to acquire state information. The switches 20' of these network elements 12-2, 12-3, 12-N can lack the "intelligence" of the switch 20 of the network element 12-1, operating simply as packet forwarding devices. Although one or more server blades of such network elements 12-2, 12-3, 12-N can be configured as a control server 40, preferably the control server 40 is implemented in the same chassis as the intelligent switch 20 to enhance reliability of transmissions and the synchronization of state information between the switch 20 and the control server 40, as described in more detail below.

Figure 3:
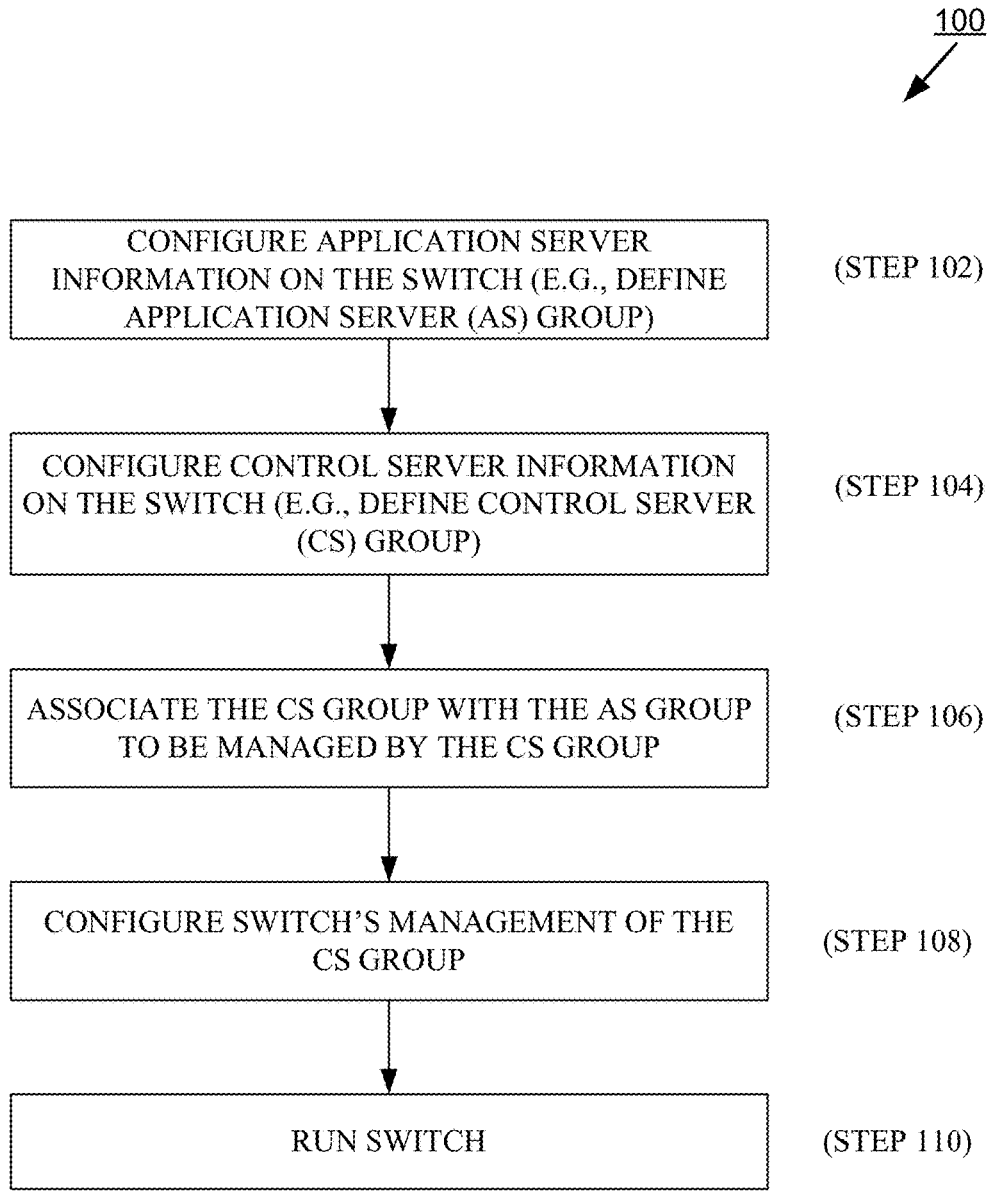
FIG. 3 is a flow diagram of an embodiment of a process of configuring a switch of a network element such that a computing process, for example, health checking, is offloaded to a control server of the network element.

FIG. 3 shows an embodiment of a process 100 for configuring the switch 20 to offload certain computing processes (e.g., health checking) from the switch 20 to the control server 40. In general, the role of the switch 20 in the offloaded process becomes that of reporting to the control server 40 periodically its current view of the state information about the application servers 44. An administrator statically configures the switch 20 to perform this role before runtime. When configuring the switch 20, the administrator defines (step 102) a group of application servers 44 (hereafter, application server group). In general, the switch 20 does not perform a designated offloaded computing process (e.g., a health check) in connection with servers placed in this group. Options available to the administrator include adding and removing servers from a group, naming the group, and selecting the offloaded process (e.g., the type of health check to be performed). Application servers 44 cannot be a member of more than one application server group.

The administrator also defines (step 104) a group of control servers 40 (hereafter, control server group). In general, the switch 20 performs health checks to servers placed in this group (as described in connection with FIG. 4). The administrator associates (step 106) this control server group with the application server group. By this association, the administrator makes the control servers 40 in the control server group responsible for communicating with each of the application servers in the application server group for purposes of performing the offloaded computing process. If multiple control servers 40 are added to the control server group, the control servers share responsibility for managing the associated application server group, and resolve amongst themselves any potential contention in the performance of this responsibility.

In addition, the administrator configures (step 108) the switch 20 for controlling communications with controls servers 40 in the control server group. This configuration can define parameters affecting, for example, the frequency of status notifications to be sent from the switch 20 to a control server 40 of the control server group, error detection, and error handling. After completion of the configuration, the switch 20 runs (step 110).

Figure 4:
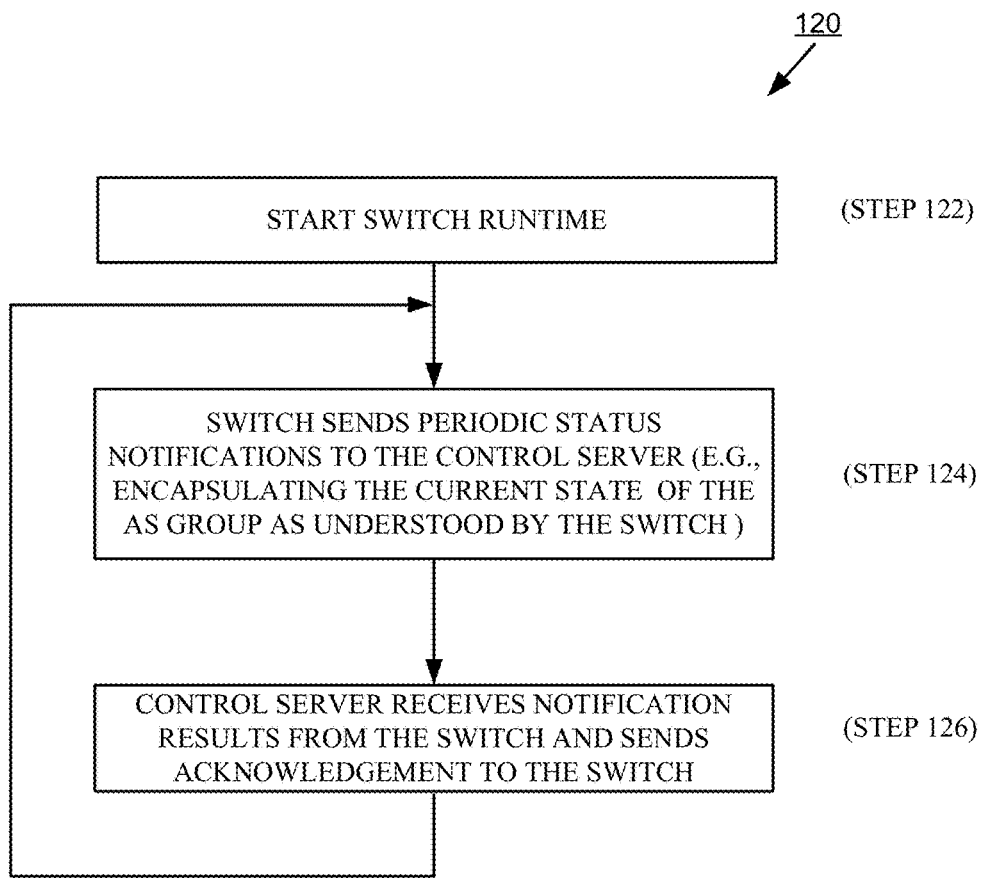
FIG. 4 is a flow diagram of an embodiment of a process by which the switch performs a health check of the control server.

FIG. 4 shows an embodiment of a process 120 by which the switch 20 performs a health check of the control server 40 in the control server group. At step 122, the configured switch 20 begins operating. While operating, the switch 20 periodically sends (step 124) status notifications to the control server 40. These status notifications include the current view of the states of the application servers 44 in the AS group according to the switch 20. The state information for each application server 44 in a status notification can include a MAC address, a IP address, a physical switch port, the operational status of the application server (disabled or enabled), and the alive state of the application server (failed or running).

In one embodiment, the switch 20 encapsulates its version of the state information of the application servers 44 in the body of an HTTP (HyperText Transport Protocol) PUT request within an Ethernet frame. The HTTP PUT request is directed to a predefined URL associated with the control server 40. The PUT request operates to cause the control server 40 to store the contents of the HTTP entity-body at the requested URL. The HTTP header of the request can be further encapsulated in Ethernet, IP, and TCP headers. In another embodiment, the switch 20 uses an HTTP Post request to carry the state information.

The control server 40 acknowledges (step 126) to the switch 20 each status notification received from the switch 20. For example, in response to an HTTP PUT request, the control server 40 replies with an HTTP 200 OK server response code to acknowledge successful receipt of the application server state table 30 in the health check data payload and successful storing at the predefined URL. The switch 20 handles all other server response codes as an error, which implies a health check failure to the control server 40.

Loss of connectivity between the control server 40 and the switch 20, for example, can result in the switch 20 operating with stale application server state information. In this event, one corrective mechanism can be to failover to a backup chassis (i.e., a backup switch). As part of the failover, all application servers 44 are initialized according to the latest synchronized state, and all control servers 40 are initialized to an "alive" state. Subsequently, the new control server 40 corrects any incorrect application server state information, and the new active switch 20 adjusts the health check states of the control servers 40 upon resuming health checks to the control server group.

Figure 5:
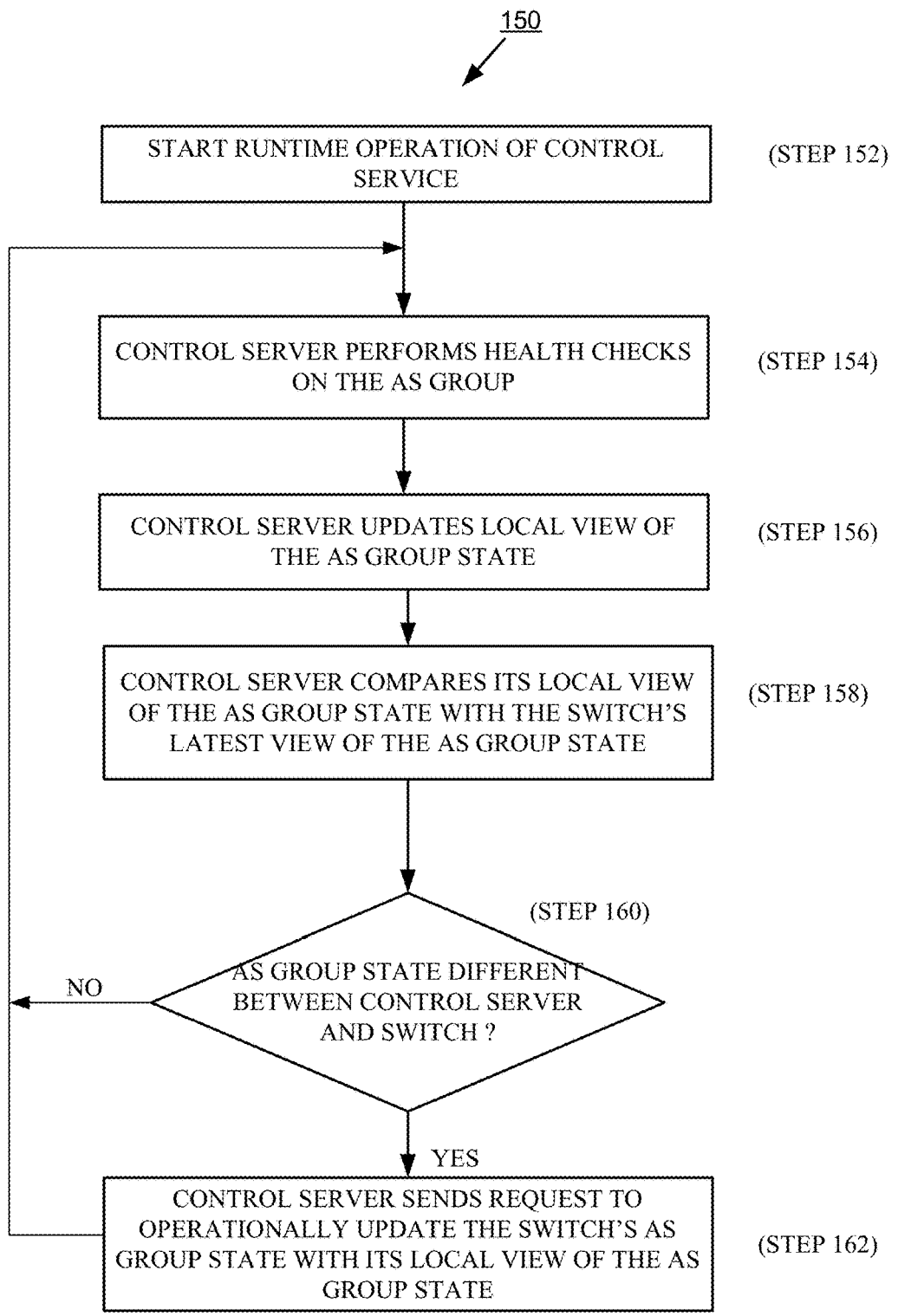
FIG. 5 is a flow diagram of an embodiment of a process by which the control server acquires state information from the application servers and updates the state information held by the switch.

FIG. 5 shows an embodiment of a process 150 by which the control server 40 performs a health check of the application servers 44 in its associated AS group and keeps the application server state information current at the switch 20. The process 150 runs concurrently with and asynchronously to transmissions of the status notifications by the switch 20, as described in connection with the process 120 of FIG. 4. The asynchronous execution of the processes 120, 150 advantageously avoids connection timeouts between the switch 20 and the control server 40, thus ensuring a reliable communication control path from the switch 20 to the control server 40. At step 152, the control server 40 executes the CS software 38 to begin the control service. During operation, the control server 40 actively performs (step 154)

health checks to the application servers 44 in its associated AS group. The administrator can pre-configure the type of health check, examples of which include, but are not limited to, a link-state health check, a PING health check, an ARP (Address Resolution Protocol) health check, a UDP/TCP (User Datagram protocol/Transmission Control Protocol) health check, a service-based health check (i.e. HTTP, SMTP, SSL, SIP, etc.), and a user scriptable health check. Based on the health check responses from the application servers 44 in the AS group, the control server 40 updates (step 156) its own local view of the AS group state.

The control server 40 compares (step 158) its updated local view of the AS group state with the view of the AS group state held by the switch 20. To obtain the current view held by the switch 20, the control server 40 references and processes the last server state table 30 stored at the predefined URL in response to the last HTTP PUT request (i.e., status notification) received from the switch 20.

If the comparison finds no differences between the views of the AS group held by the switch 20 and the control server 40, the process 150 continues with step 154, wherein the control server 40 continues performing health checks on the application servers 44 of the AS group. If the control server 40 identifies (step 160) a difference in the views of the AS group state, the control server 40 sends (step 162) a request to the switch 20 directing the switch 20 to update its AS group state with the view held by the control server 40.

Out-of-sync state tables between the switch 20 and the control server 40 can potentially occur because of transient state changes or request errors resulting from dropped packets, out-of-order packet transfers, or a failure to execute an operational command. Such loss of synchronization is inherent to designs that offload state. Error handling on out-of-sync state tables is generally self-correcting because of the asynchronous processing of the state table independent of the health check cycle. Both state table views on the switch 20 and the control server 40 are expected to converge at steady state because of the periodic view updates sent by the switch 20 to the control server 40.

For instance, if the control server 40 finds a difference in the "alive" state (ena/dis) for an application server 44, the control server 40 can issue an operational command to the switch 20 (through the switch's API 32 via SNMP) to set the "alive" state for the application server 44 to the current state. If the control server 40 finds a difference in the MAC or port for an application server 44, the control server 40 can issue an operational command to the switch 20 (through the switch's API 32 via SNMP) to perform an ARP update request to the pertinent application server 44. If an error occurs while issuing any operational commands, or if the application server state difference persists, the control server 40 can retry the operation until the number of retries reaches a predefined maximum (defined on the control server 40). If the state tables between the switch 20 and the control server 40 do not converge within the maximum number of retries, the control server 40 can attempt to operationally disable the discrepant application server 44 by issuing an "oper dis" command directly to the switch 20 to disable the application server 44.

Figure 6:
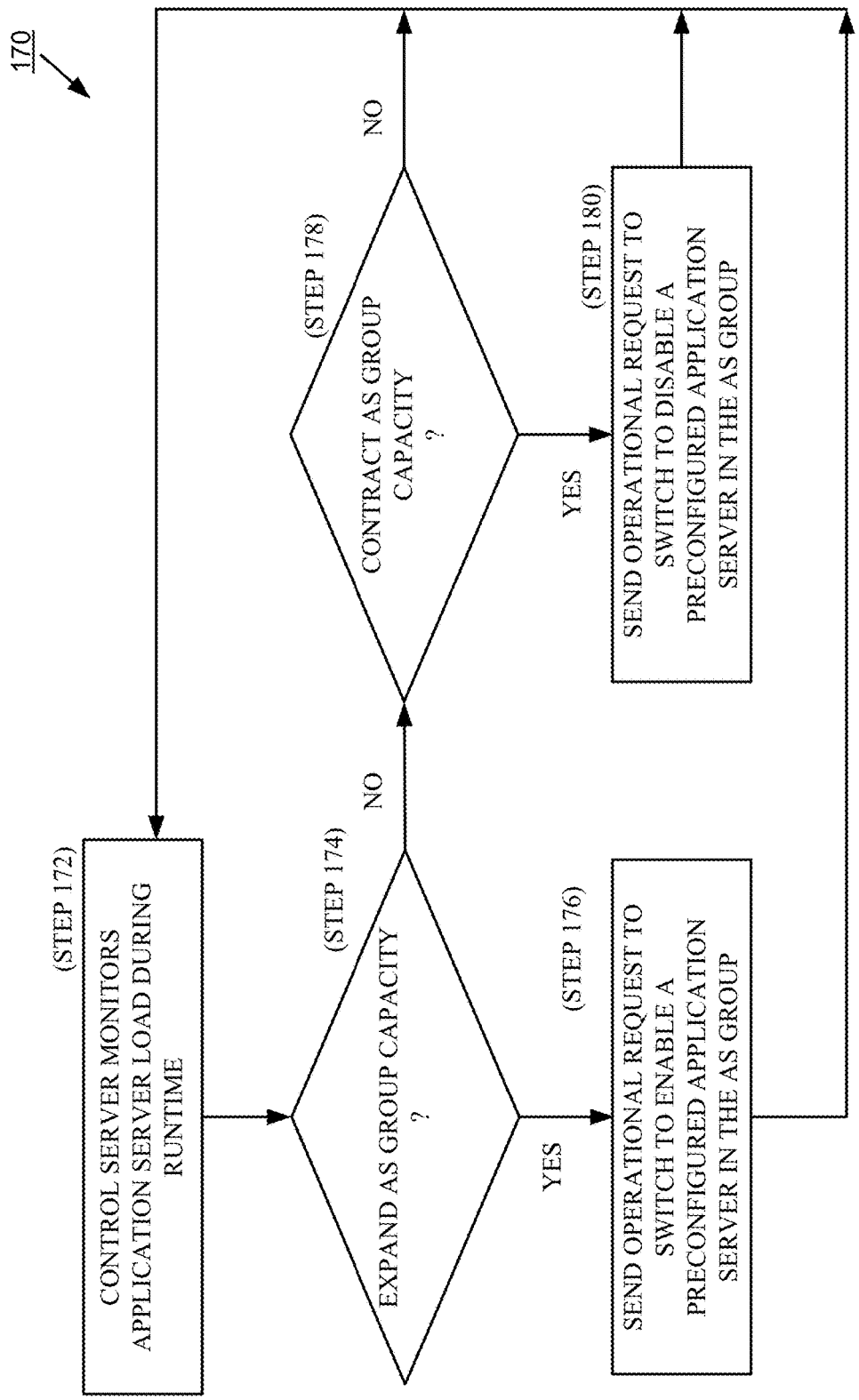
FIG. 6 is a flow diagram of an embodiment of a process by which the control server can increase, decrease, or leave unchanged the number of enabled application servers in the data center in response to the workload of the application servers.

With the management of the AS group offloaded to the control server 40, the control server 40 acquires the ability to enable and disable dynamically preconfigured application servers 44 in the AS group on the switch 20 during runtime. This capability effectively allows the control server 40 to expand or contract the workload capacity of the AS group during runtime. FIG. 6 shows an embodiment of a process 170 for controlling the capacity of the AS group during runtime. At step 172, the control server 40 monitors the workload on the application servers 44 in the AS group.

If, from the monitoring, the control server 40 determines (step 174) to expand the capacity of the AS group, the control server 40 sends (step 176) a request to the switch 20 to enable and make alive a preconfigured application server 44 in the AS group and the process returns to step 172, with the control server 40 continuing to monitor the workload on the application servers 44. (Before the switch 20 received enable command, the application server 44 was already configured as part of the AS group, but was operationally disabled). The request to enable the application server 44 can be included in an operational update command sent by the control server 40 to the switch 20 (e.g., through SNMP). Alternatively, the control server 40 may determine (step 178) to contract the capacity of the AS group (e.g., off-peak work hours). In that event, the control server 40 sends (step 180) a command to the switch 20 to disable a preconfigured application server 44 in the AS group and the process returns to step 172, with the control server 40 continuing to monitor the workload on the application servers 44. The disabled application server 44 remains part of the AS group, and can be later enabled and made alive should the control server 40 so deem. If the decision based on the monitoring is neither to expand nor contract the AS group capacity, the process returns to step 172, with the control server 40 continuing to monitor the workload on the application servers 44.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C#, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of increasing performance of a datacenter comprising:
coupling a plurality of server blades in a manner that allows any of the server blades to be designated a control server and one or more of the other server blades being designated as application servers, and a designated control server is capable of communicating with each application server;
selecting one server blade as the control server, and coupling each blade server to a switch such that each server blade can communicate with the switch;

employing the switch to acquire state information about each application server;

the switch directing an amount of data traffic it receives to each application server based upon the acquired state information of each application server;

the switch offloading to the control server a computational process of performing a health check on the application servers to obtain state information of the one or more application servers when the computational load of the switch exceeds a predetermined amount;

receiving at the switch the state information of the application servers from the control server; and directing data traffic the switch receives to each application server based upon the state information about each application server received from the control server; and monitoring, by the control server, a workload of the application servers, and dynamically expanding a capacity of the group of application servers if based on the workload additional capacity is warranted; and dynamically contracting the capacity of the group of application servers if based on the workload, the group of application servers has excess capacity.

2. The method of claim 1, wherein the state information obtained from each application server is encapsulated within a body of an HTTP (HyperText Transport Protocol) PUT request within an Ethernet frame.

3. The method of claim 1, wherein the switch includes a configuration comprising a defined group of the application servers and an association of the control server with the group.

4. The method of claim 1, further comprising the steps of:

determining, by the control server, that the state information from the application servers differs from state information of the application servers held by the switch; and commanding the switch to update the current state information with the second state information if it is determined that these differ.

5. The method of claim 4, wherein said commanding comprises commanding the switch to update an alive state for a given one of the application servers.

6. The method of claim 4, wherein said commanding comprises commanding the switch to perform an ARP update request to a given one of the application servers.

7. The method of claim 4, further comprising the step of:

storing the current state information in a state table at a predefined URL.

\* \* \* \* \*